(12) United States Patent
Hu et al.

(10) Patent No.: US 11,936,635 B2
(45) Date of Patent: Mar. 19, 2024

(54) METHOD, ELECTRONIC DEVICE, AND PROGRAM PRODUCT IMPLEMENTED AT AN EDGE SWITCH FOR DATA ENCRYPTION

(71) Applicant: EMC IP Holding Company LLC, Hopkinton, MA (US)

(72) Inventors: Chenxi Hu, Beijing (CN); Sanping Li, Beijing (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/321,720

(22) Filed: May 17, 2021

(65) Prior Publication Data
US 2022/0345450 A1  Oct. 27, 2022

(30) Foreign Application Priority Data
Apr. 23, 2021  (CN) .......................... 202110442980.0

(51) Int. Cl.
*H04L 9/40* (2022.01)

(52) U.S. Cl.
CPC ...... *H04L 63/0485* (2013.01); *H04L 63/0471* (2013.01); *H04L 63/0492* (2013.01); *H04L 63/126* (2013.01); *H04L 2463/041* (2013.01)

(58) Field of Classification Search
CPC ............. H04L 63/0471; H04L 63/0485; H04L 63/0492; H04L 2463/041
See application file for complete search history.

(56) References Cited

U.S. PATENT DOCUMENTS 9,185,088 B1 * 11/2015 Bowen ................ H04L 63/0471
10,346,614 B1 * 7/2019 Ko ....................... H04L 63/0471
(Continued)

FOREIGN PATENT DOCUMENTS

| CN | 101554009 A | 10/2009 |
| CN | 104202187 A | 12/2014 |

(Continued)

OTHER PUBLICATIONS

Schneier, Bruce "Applied Cryptography, Second Edition: Protocols, Algorithms, and Source Code in C", 1996, Wiley Computer Publishing, John Wiley & Sons, Inc. ISBN: 0471128457, pp. 336-339 (Year: 1996).*

(Continued)

*Primary Examiner* — Eric W Shepperd
(74) *Attorney, Agent, or Firm* — Ryan, Mason & Lewis, LLP

(57) ABSTRACT

Embodiments of the present disclosure provide a method, an electronic device, and a program product implemented at an edge switch for data encryption. For example, the present disclosure provides a data encryption method implemented at an edge switch. The method may include receiving encryption and decryption information for an encryption operation or a decryption operation from a source device. In addition, the method may include encrypting a data packet received from the source device based on encryption information in the encryption and decryption information to generate an encrypted data packet. The method may further include sending the encrypted data packet to a target device indicated by the data packet. The embodiments of the present disclosure can reduce the computing loads of Internet of Things (IoT) devices, clouds, and servers while ensuring encryption performance, and can also reduce the time delay caused by encryption and decryption operations.

17 Claims, 6 Drawing Sheets

(56) References Cited

U.S. PATENT DOCUMENTS

| | | | |
|---|---|---|---|
| 2002/0038371 A1* | 3/2002 | Spacey | H04L 63/0272 709/227 |
| 2006/0171403 A1* | 8/2006 | Kim | H04W 84/22 370/410 |
| 2007/0101134 A1 | 5/2007 | Parlan et al. | |
| 2014/0259147 A1* | 9/2014 | L'Heureux | H04L 63/02 726/14 |
| 2017/0201504 A1* | 7/2017 | Funk | H04L 63/0471 |
| 2018/0063079 A1* | 3/2018 | Ding | H04L 63/0464 |
| 2018/0103018 A1* | 4/2018 | Chauhan | H04L 63/0485 |
| 2018/0152894 A1* | 5/2018 | Lin | H04W 52/0241 |
| 2018/0176079 A1* | 6/2018 | Teo | H04W 52/0219 |
| 2020/0007517 A1* | 1/2020 | Spahn | H04L 45/22 |
| 2020/0304304 A1* | 9/2020 | Yankovskiy | H04L 9/0897 |
| 2021/0067956 A1* | 3/2021 | Vigneswaran | H04W 12/06 |
| 2021/0243016 A1* | 8/2021 | Hu | H04L 9/14 |
| 2021/0400767 A1* | 12/2021 | Zubiaur | H04W 4/38 |
| 2022/0038288 A1* | 2/2022 | Chakra | H04L 9/3271 |

FOREIGN PATENT DOCUMENTS

| | | |
|---|---|---|
| CN | 106980794 A | 7/2017 |
| CN | 107332660 A | 11/2017 |
| CN | 109510826 A | 3/2019 |
| CN | 110710153 A | 1/2020 |

OTHER PUBLICATIONS

King et al. "A Distributed Security Mechanism for Resource-Constrained IoT Devices" [Online], Mar. 2016[Retrieved on: Sep. 25, 2016], Informatica 40, No. 1, Retrieved from: <https://informatica.si/index.php/informatica/article/download/1046/841> (Year: 2016).*

Wikipedia, "Advanced Encryption Standard," https://en.wikipedia.org/w/index.php?title=Advanced_Encryption_Standard&oldid=1008726613, May 5, 2021, 14 pages.

Intel Corporation, "Intel Programmable Ethernet Switch Products," https://www.intel.com/content/www/us/en/products/network-io/programmable-ethernet-switch.html, Accessed Feb. 24, 2021, 5 pages.

X. Chen, "Implementing AES Encryption on Programmable Switches via Scrambled Lookup Tables," In ACM SIGCOMM 2020 Workshop on Secure Programmable Network Infrastructure (SPIN 2020), Aug. 14, 2020, 7 pages.

* cited by examiner

METHOD, ELECTRONIC DEVICE, AND PROGRAM PRODUCT IMPLEMENTED AT AN EDGE SWITCH FOR DATA ENCRYPTION

RELATED APPLICATION(S)

The present application claims priority to Chinese Patent Application No. 202110442980.0, filed Apr. 23, 2021, and entitled "Method, Electronic Device, and Program Product Implemented at an Edge Switch for Data Encryption," which is incorporated by reference herein in its entirety.

FIELD

Embodiments of the present disclosure relate to the field of Internet of Things (IoT), and more particularly, to a method, an electronic device, and a computer program product implemented at an edge switch for data encryption.

BACKGROUND

With the development of IoT technology, more and more IoT devices have been widely used. Some IoT devices, such as air conditioners, smart locks, traffic lights, and web cameras can communicate with clouds or servers through edge switches communicatively connected thereto. In order to ensure the security of communication, data sent from IoT devices usually needs to be encrypted, and data received by IoT devices usually needs to be decrypted. Good encryption and decryption algorithms usually consume considerable computing power, which is not friendly to edge IoT devices that are usually only provided with basic computing functions. In addition, due to the limitation of computing resources on clouds or servers, encryption and decryption algorithms are sometimes a burden on the cloud or server sides.

SUMMARY

Embodiments of the present disclosure provide a solution for implementing data encryption at an edge switch.

In a first aspect of the present disclosure, a data encryption method implemented at an edge switch is provided. The method may include receiving encryption and decryption information for an encryption operation or a decryption operation from a source device. In addition, the method may include encrypting a data packet received from the source device based on encryption information in the encryption and decryption information to generate an encrypted data packet. The method may further include sending the encrypted data packet to a target device indicated by the data packet.

In a second aspect of the present disclosure, an electronic device is provided, which includes: a processor; and a memory coupled to the processor and having instructions stored therein, where the instructions, when executed by the processor, cause the electronic device to perform actions. The actions may include: receiving encryption and decryption information for an encryption operation or a decryption operation from a source device; encrypting a data packet received from the source device based on encryption information in the encryption and decryption information to generate an encrypted data packet; and sending the encrypted data packet to a target device indicated by the data packet.

In a third aspect of the present disclosure, a computer program product is provided. The computer program product is tangibly stored on a computer-readable medium and includes machine-executable instructions. The machine-executable instructions, when executed, cause a machine to perform any steps of the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By more detailed description of example embodiments of the present disclosure with reference to the accompanying drawings, the above and other objectives, features, and advantages of the present disclosure will become more apparent, where identical or similar reference numerals generally represent identical or similar components in the example embodiments of the present disclosure. In the accompanying drawings.

DETAILED DESCRIPTION

The principles of the present disclosure will be described below with reference to some example embodiments shown in the accompanying drawings.

As used herein, the term "include" and variations thereof mean open-ended inclusion, that is, "including but not limited to." Unless specifically stated otherwise, the term "or" indicates "and/or." The term "based on" means "based at least in part on." The terms "an example embodiment" and "an embodiment" indicate "a group of example embodiments." The term "another embodiment" indicates "a group of additional embodiments." The terms "first," "second," and the like may refer to different or identical objects. Other explicit and implicit definitions may also be included below.

As discussed above, during data transmission, in order to ensure communication security, data encryption and decryption are usually performed on the data transmitting side and receiving side, respectively. There are a variety of data encryption algorithms currently. As one of the most popular algorithms in symmetric key encryption, an advanced encryption standard (AES) algorithm is usually used for data encryption and decryption. However, the encryption and decryption calculation processes of advanced encryption algorithms such as the AES are relatively complicated.

In an IoT device on the transmitting side, an embedded central processing unit (CPU) usually does not have strong computing power, and will generate considerable waiting time when performing encryption or decryption. Therefore, the traditional process of data encryption and decryption in the IoT device limits the efficient transmission of data. In addition, in a cloud or server on the receiving side, due to limited cloud or server computing resources, the foregoing encryption mechanism sometimes becomes a computational burden. Therefore, the traditional process of data encryption and decryption in the cloud or server also limits the efficient transmission of data.

In order to address, at least in part, the above disadvantages, the embodiments of the present disclosure provide a solution for implementing data encryption and/or decryption at an edge switch. This solution can transfer computing operations such as AES encryption and decryption algorithms from IoT devices to edge switches. Correspondingly, this solution can also transfer computing operations such as AES encryption and decryption algorithms from clouds or servers to corresponding switches. Therefore, the computing power of edge switches can be used to implement data encryption and decryption operations.

Figure 1:
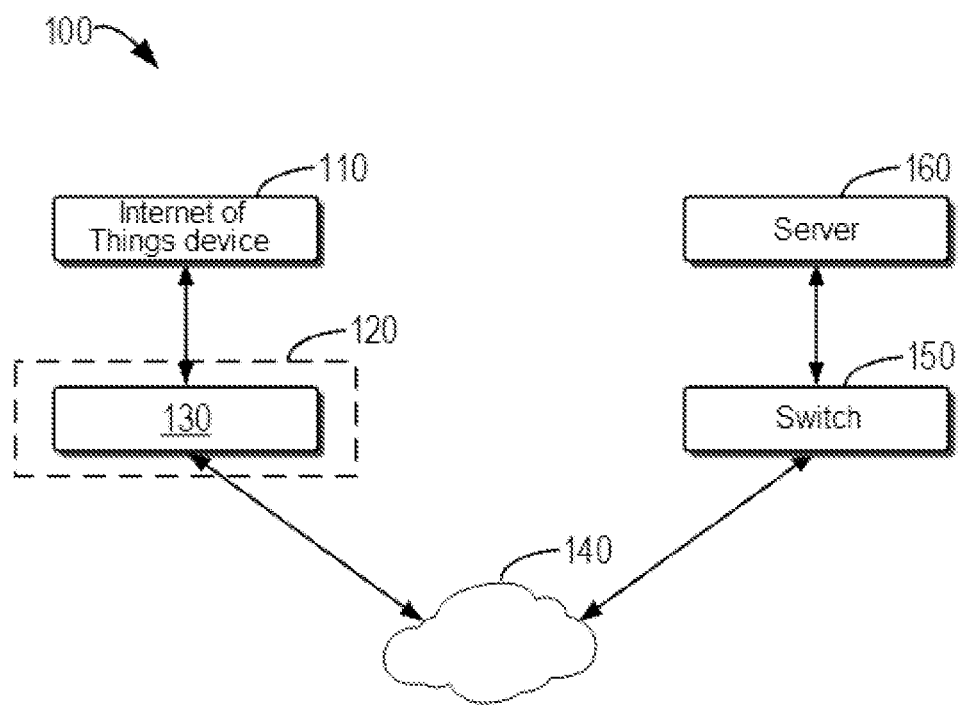
FIG. 1 shows a schematic diagram of an example environment according to an embodiment of the present disclosure.

FIG. 1 shows a schematic diagram of example environment 100 according to an embodiment of the present disclosure. In example environment 100, a device and/or a process according to embodiments of the present disclosure can be implemented. As shown in FIG. 1, example environment 100 may include IoT device 110. IoT device 110 is generally an edge computing node that has limited computing power and is used to perform specific functions. As an example, IoT device 110 may be an air conditioner, an intelligent lock, a traffic light, a network camera, etc.

In order to transmit data, IoT device 110 is usually communicatively connected to edge switch 120. Edge switch 120 is usually disposed near IoT device 110, which serves as an edge computing node, so as to provide a data exchange service for the corresponding IoT device. In order to undertake the computing tasks of data encryption and decryption operations of IoT device 110, computing device 130 disposed in edge switch 120 may encrypt a data packet received from IoT device 110 based on encryption and decryption information for an encryption operation or a decryption operation received from IoT device 110.

It should be understood that computing device 130 may be any device with computing power that is disposed in edge switch 120 or is communicatively connected to edge switch 120. As a non-limiting example, the computing device may be any type of fixed computing device, mobile computing device, or portable computing device, including but not limited to a desktop computer, a laptop computer, a notebook computer, a netbook computer, a tablet computer, a smart phone, and the like. All or part of the components of the computing device may be distributed in the cloud. The computing device may also adopt a cloud-edge architecture.

In addition, edge switch 120 may also include a storage apparatus (not shown). The storage apparatus includes a register for storing data. In addition, the storage apparatus may also be a storage disk(s). The storage disks may be various types of devices with a storage function, including but not limited to a hard disk drive (HDD), a solid state disk (SSD), a removable disk, any other magnetic storage device and any other optical storage device, or any combination thereof. As an example, a data packet to be encrypted may be divided into a plurality of data blocks, and computing device 130 may sequentially perform an encryption operation on these data blocks. Whenever the encryption operation is performed on a data block, the encrypted data block can be stored in the storage apparatus. Moreover, after all the data blocks of the data packet are encrypted, all the data blocks stored in the storage apparatus can be combined into an encrypted data packet.

After encrypting the data packet from IoT device 110, computing device 130 may send the encrypted data packet to cloud (network) 140, and the encrypted data packet may be sent to switch 150 via cloud 140. Switch 150 is similar to edge switch 120 in that the data packet can be decrypted and the decrypted data packet can be sent to server 160 corresponding to the switch. Therefore, data communication from IoT device 110 to server 160 is realized, and the data encryption and decryption operations of the communication are all completed at the corresponding switch. The above data transmission process is reversible.

It should be understood that the architecture and functions of example environment 100 are described for illustrative purposes only, and do not imply any limitation to the scope of the present disclosure. The embodiments of the present disclosure may also be applied to other environments having different structures and/or functions.

A process according to an embodiment of the present disclosure will be described in detail below with reference to FIG. 2 to FIG. 4. For ease of understanding, specific data mentioned in the following description is illustrative and is not intended to limit the protection scope of the present disclosure. It should be understood that the embodiments described below may also include additional actions not shown and/or may omit actions shown, and the scope of the present disclosure is not limited in this regard.

Figure 2:
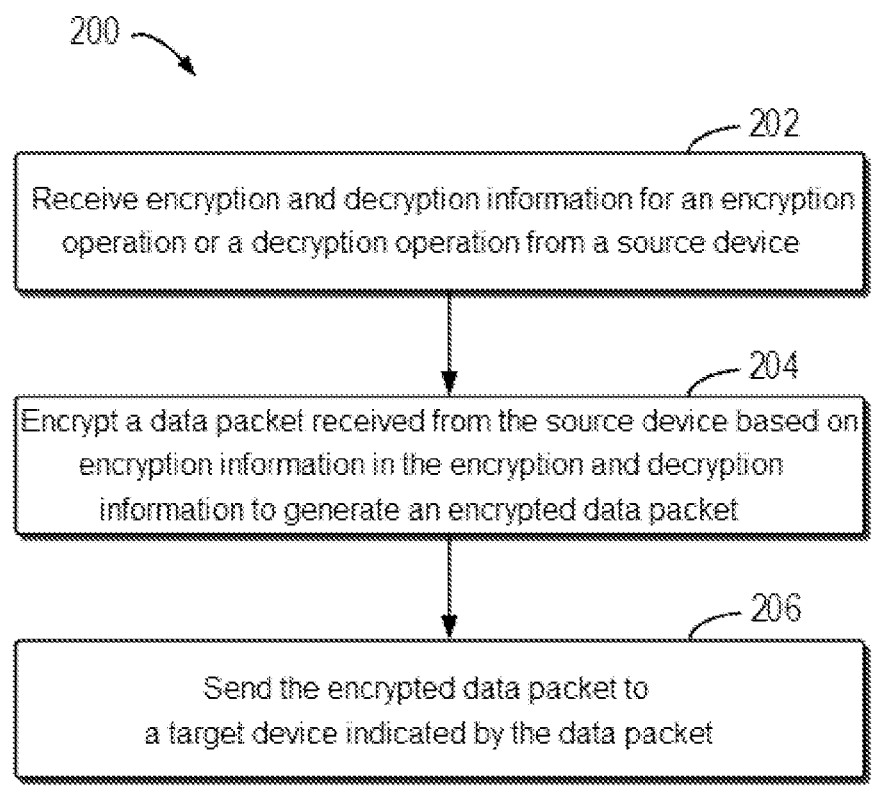
FIG. 2 shows a flowchart of a process of data encryption implemented at an edge switch according to an embodiment of the present disclosure.

FIG. 2 shows a flowchart of process 200 of data encryption implemented at an edge switch according to an embodiment of the present disclosure. In certain embodiments, process 200 may be implemented in computing device 130 in FIG. 1. Process 200 for data encryption according to an embodiment of the present disclosure is described now with reference to FIG. 1. For ease of understanding, specific examples mentioned in the following description are illustrative and are not intended to limit the protection scope of the present disclosure.

As shown in FIG. 2, at 202, computing device 130 can receive encryption and decryption information for an encryption operation or a decryption operation from a source device. As an example, the source device may be IoT device 110 as shown in FIG. 1.

In certain embodiments, in order to determine whether computing device 130 in edge switch 120 has an encryption or decryption function, IoT device 110 can send an encryption service request message to edge switch 120. When computing device 130 determines that the encryption service request message is received from IoT device 110, computing device 130 may send an encryption service response message to IoT device 110 to inform IoT device 110 that edge switch 120 can provide encryption services. In this way, IoT device 110 can be prevented from directly sending encryption and decryption information and data packets to an edge switch that has no encryption and decryption functions.

Next, at 204, computing device 130 can encrypt a data packet received from the source device based on encryption information in the received encryption and decryption information to generate an encrypted data packet. In certain embodiments, in order to reduce the computational load of computing device 130, encryption such as an AES algorithm may be performed to determine an encryption result utilizing a lookup table. Therefore, the computing device can acquire a lookup table or other data structures used for encryption from the encryption information in the encryption and decryption information, and perform encryption on the data packet based on the lookup table. Therefore, the complexity of encryption can be greatly reduced, thereby saving the computing resources of edge switch 120.

In certain embodiments, in order to further save the computing resources of computing device 130 such as a CPU in edge switch 120, computing device 130 may also use a programmable circuit component in edge switch 120 to complete the encryption operation of the data packet. FIG. 3 shows a flowchart of process 300 of encrypting a data packet by using a programmable circuit component in an edge switch according to an embodiment of the present disclosure. In certain embodiments, process 300 may be implemented in computing device 130 in FIG. 1. Referring to FIG. 1, process 300 of encrypting a data packet by using a programmable circuit component in an edge switch 120 according to an embodiment of the present disclosure is described. For ease of understanding, specific examples mentioned in the following description are illustrative and are not intended to limit the protection scope of the present disclosure.

Figure 3:
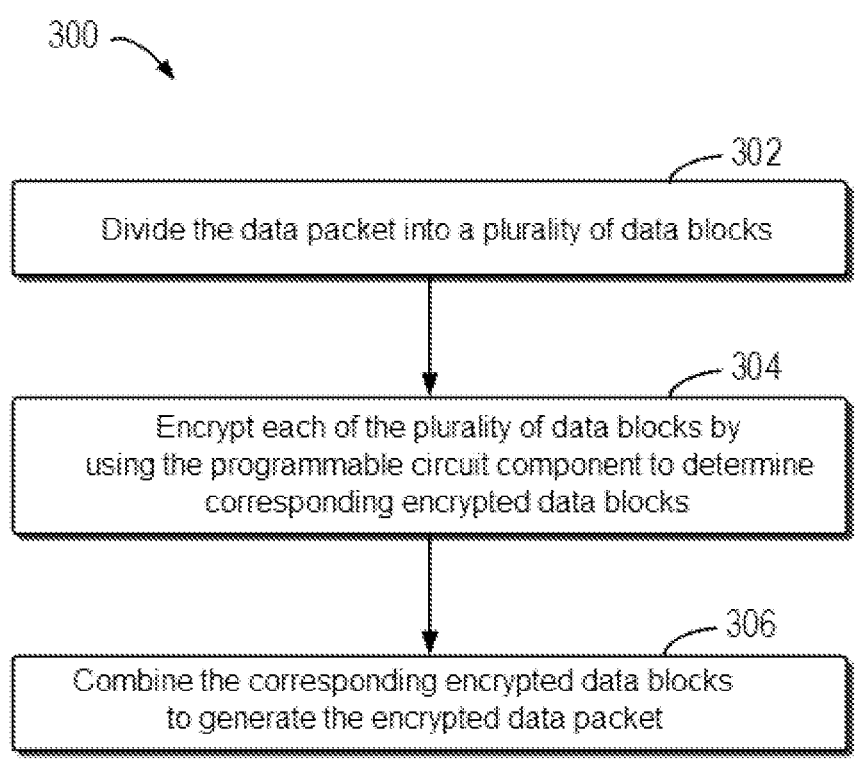
FIG. 3 shows a flowchart of a process of encrypting a data packet by using a programmable circuit component in an edge switch according to an embodiment of the present disclosure.

As shown in FIG. 3, at 302, computing device 130 may divide a data packet received from IoT device 110 into a plurality of data blocks. As an example, computing device 130 may divide the data packet into eight data blocks, and each data block has a specific order and number.

At 304, computing device 130 may encrypt each of the data blocks by using a programmable circuit component in edge switch 120 to determine corresponding encrypted data blocks. As an example, the programmable circuit component may be a programmable switch chip.

At 306, computing device 130 may combine the corresponding encrypted data blocks to generate the encrypted data packet. In certain embodiments, a data packet to be encrypted may be divided into a plurality of data blocks, and computing device 130 may sequentially perform an encryption operation on these data blocks. Whenever the encryption operation is performed on a data block, the encrypted data block can be stored in a register in edge switch 120. Moreover, after all the data blocks of the data packet are encrypted, all the data blocks stored in the register can be combined into an encrypted data packet. In this way, the data blocks can be encrypted one by one in a pipeline manner, so that a programmable circuit component such as a programmable switch chip can complete the data packet encryption task.

As an example, when the programmable switch chip receives an ingress data packet, a first data block will be encrypted or decrypted in an ingress session. The encryption or decryption result can be stored in the register. After that, the programmable switch chip will eject a first data block in an egress session, and then redistribute other data packets. For example, in the ingress session, a second data block may be processed by the same logic. When all the data blocks are processed, the results stored in the register will be pushed back to an empty data packet, thereby synthesizing the encrypted data packet.

After that, returning to FIG. 2, at 206, computing device 130 can send the encrypted data packet to a target device indicated by the data packet. As an example, the target device may be server 160 in FIG. 1. It should be understood that the encryption and decryption information may include encryption information used for AES algorithm encryption (such as a key), and may also include server location information (such as an IP address).

In certain embodiments, symmetrical to the above encryption process, computing device 130 may also decrypt encrypted data received from the target device side, such as server 160. FIG. 4 shows a flowchart of process 400 of data decryption implemented at an edge switch according to an embodiment of the present disclosure. In certain embodiments, process 400 may be implemented in computing device 130 in FIG. 1. Referring to FIG. 1, process 400 of data decryption implemented at an edge switch 120 according to an embodiment of the present disclosure is described. For ease of understanding, specific examples mentioned in the following description are illustrative and are not intended to limit the protection scope of the present disclosure.

Figure 4:
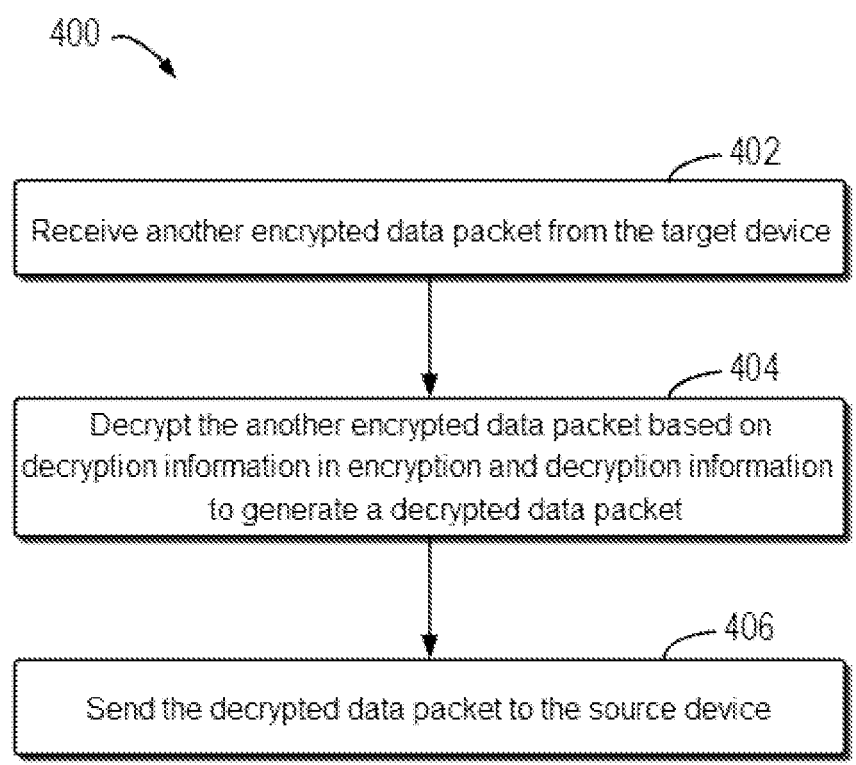
FIG. 4 shows a flowchart of a process of data decryption implemented at an edge switch according to an embodiment of the present disclosure.

As shown in FIG. 4, at 402, computing device 130 can receive another encrypted data packet from a target device such as server 160. It should be understood that based on the symmetrical arrangement of an encryption and decryption system, the other encrypted data packet may be a data packet encrypted by switch 150, and the data packet is transferred to edge switch 120 via cloud (network) 140.

At 404, computing device 130 can decrypt the other encrypted data packet based on decryption information in the encryption and decryption information to generate a decrypted data packet. After that, at 406, computing device 130 can send the decrypted data packet to the source device such as IoT device 110.

Figure 5:
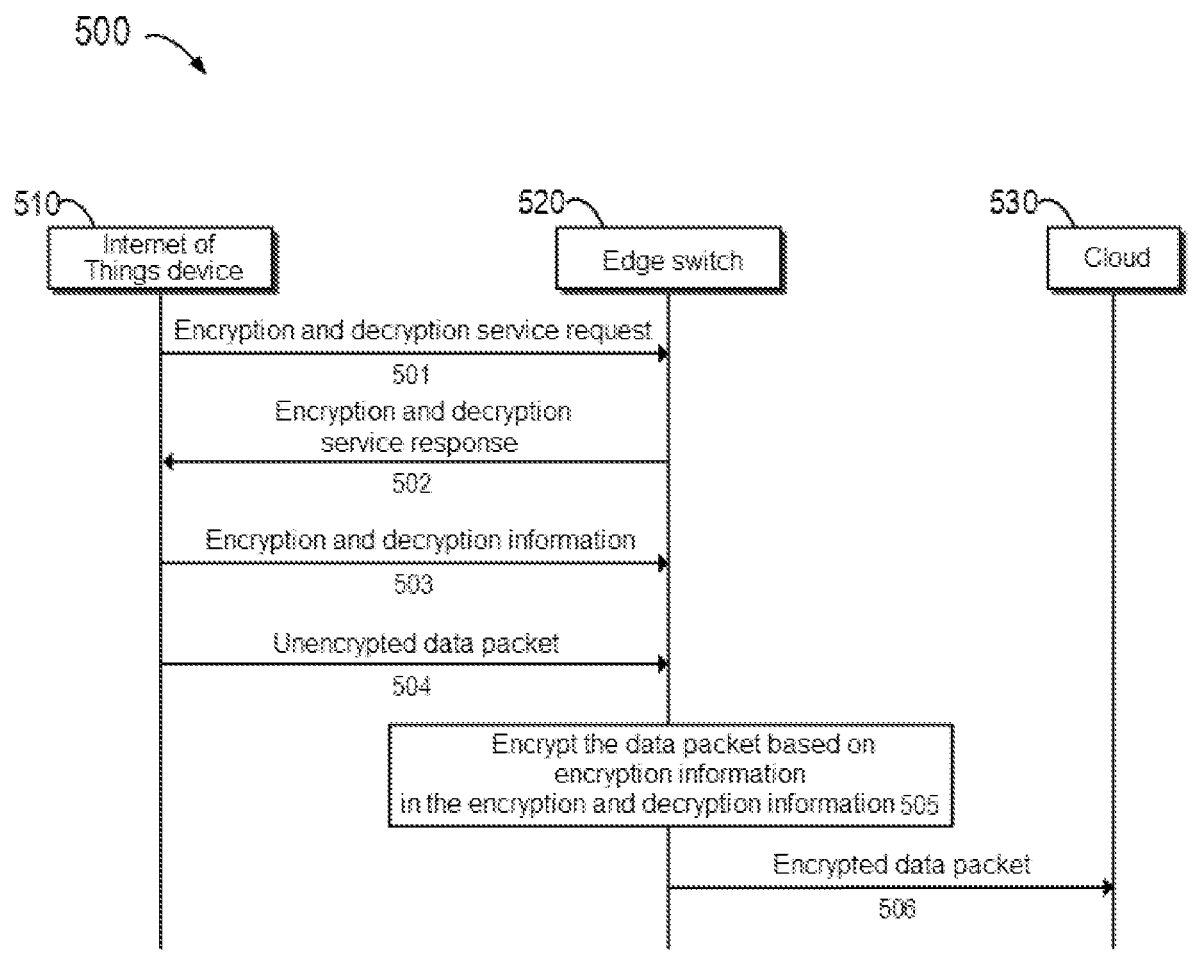
FIG. 5 shows a high-level pipeline diagram of a process of data encryption implemented at an edge switch according to an embodiment of the present disclosure.

In order to illustrate aspects of the present disclosure more clearly, FIG. 5 shows a high-level pipeline diagram of process 500 of data encryption implemented at an edge switch according to an embodiment of the present disclosure.

As shown in FIG. 5, when IoT device 510 needs to upload a data packet to cloud 530, in order to determine whether edge switch 520 has an encryption or decryption function, IoT device 510 may first send encryption and decryption service request 501 to edge switch 520 disposed nearby. After edge switch 520 receives an encryption and decryption service request message from IoT device 510, edge switch 520 may send encryption and decryption service response message 502 to IoT device 510 to inform IoT device 510 that edge switch 520 can provide encryption and decryption services. In this way, IoT device 510 can be prevented from directly sending encryption and decryption information and data packets to an edge switch that has no encryption and decryption functions.

After it is determined that edge switch 520 has the function of encrypting and decrypting data packets, IoT device 510 can further send encryption and decryption information 503 to edge switch 520. It should be understood that encryption and decryption information 503 may include information such as a lookup table used for encryption and decryption calculations, a key used for encryption or decryption operations, and an IP address of cloud 530, which serves as a target device. Edge switch 520 may store encryption and decryption information 503 or perform encryption and decryption operation initialization based on encryption and decryption information 503. After that, IoT device 510 may send unencrypted data packet 504 to be sent to edge switch 520.

After receiving the data packet, edge switch 520 may create event (or task) 505 that encrypts the data packet based on the encryption information in the encryption and decryption information. As an example, edge switch 520 may use a programmable switch chip therein to perform an encryption operation. In order to reduce the amount of calculation, the encryption operation may be performed through the above lookup table for encryption and decryption calculations. In order to enable the programmable switch chip to process a larger data packet, the data packet can be divided into a plurality of data blocks and an encryption operation can be performed on each data block sequentially. After that, edge switch 520 can transmit encrypted data packet 506 to cloud 530.

Through the above embodiments, the solution for performing encryption and decryption at an edge switch of the present disclosure can reduce the computing loads of IoT devices, clouds, and servers while ensuring encryption performance, and can also reduce the time delay caused by encryption and decryption operations. The encryption and decryption architecture of the present disclosure can establish a trustworthy relay that undertakes encryption and decryption tasks between IoT devices and servers, and the relay is an edge switch that already exists in a communication system. In addition, through the use of programmable edge switches, AES encryption and decryption calculations can be transferred from IoT devices to programmable edge switches, so that IoT devices can obtain better performance, higher throughput, and lower secure data transmission delay.

Figure 6:
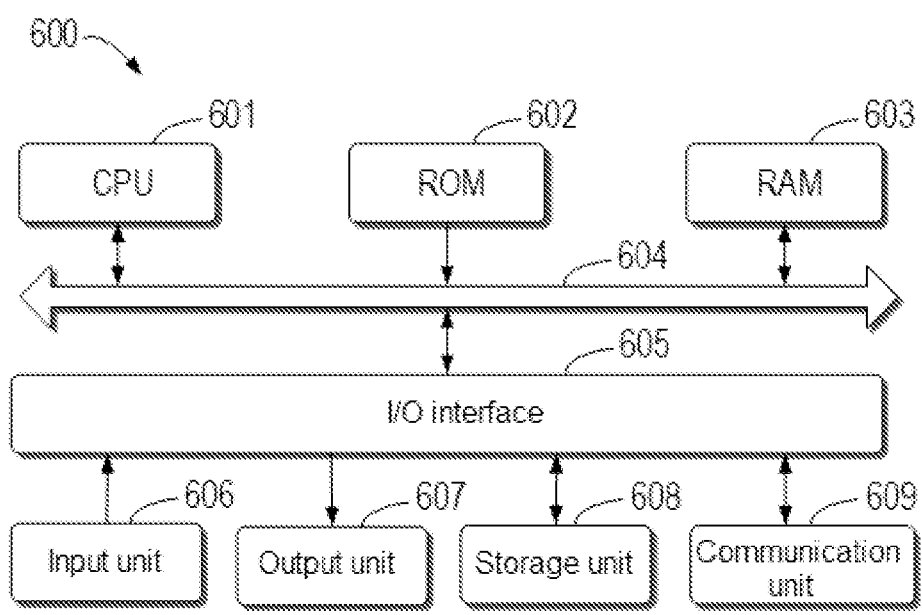
FIG. 6 shows a block diagram of an example device that may be used to implement an embodiment of the present disclosure.

FIG. 6 shows a schematic block diagram of example electronic device 600 that can be used to implement an embodiment of the present disclosure. For example, electronic device 600 can be configured to implement computing device 130 as shown in FIG. 1. As shown in the drawing, electronic device 600 includes CPU 601 that can perform various appropriate actions and processing according to computer program instructions stored in read-only memory (ROM) 602 or computer program instructions loaded from storage unit 608 into random access memory (RAM) 603. In RAM 603, various programs and data required for operations of device 600 may also be stored. CPU 601, ROM 602, and RAM 603 are connected to each other through bus 604. Input/output (I/O) interface 605 is also connected to bus 604.

Multiple components in device 600 are connected to I/O interface 605, including: input unit 606, such as a keyboard or a mouse; output unit 607, such as various types of displays or speakers; storage unit 608, such as a magnetic disk or an optical disc; and communication unit 609, such as a network card, a modem, or a wireless communication transceiver. Communication unit 609 allows device 600 to exchange information/data with other devices over a computer network such as an Internet and/or various telecommunication networks.

CPU 601 performs the various methods and processing described above, such as processes 200, 300, and 400. For example, in some embodiments, the various methods and processing described above may be implemented as a computer software program or a computer program product, which is tangibly included in a machine-readable medium, such as storage unit 608. In some embodiments, part or all of the computer program may be loaded and/or installed onto device 600 via ROM 602 and/or communication unit 609. When the computer program is loaded into RAM 603 and executed by CPU 601, one or more steps of any process described above may be implemented. Alternatively, in other embodiments, CPU 601 may be configured in any other suitable manner (for example, by means of firmware) to perform a process such as processes 200, 300, and 400.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any non-temporary storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

The computer program instructions for executing the operations of the present disclosure may be assembly instructions, instruction set architecture (ISA) instructions, machine instructions, machine-dependent instructions, microcode, firmware instructions, state setting data, or source code or object code written in any combination of one or more programming languages, including object oriented programming languages such as Smalltalk and C++ and conventional procedural programming languages such as "C" language or similar programming languages. The computer-readable program instructions may be executed entirely on a user's computer, partly on a user's computer, as a stand-alone software package, partly on a user's computer and partly on a remote computer, or entirely on a remote computer or a server. When a remote computer is involved, the remote computer may be connected to a user computer through any kind of network, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus (system), and the computer program product implemented according to the embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flowcharts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed basically in parallel, and sometimes they may also be executed in an inverse order, which depends on the functions involved. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The foregoing description is illustrative rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, and to otherwise enable persons of ordinary skill in the art to understand the implementations disclosed herein.

What is claimed is:

1. A data encryption method implemented at an edge switch, comprising:
   receiving an encryption and/or decryption service request from a source device;
   determining whether or not the edge switch can perform at least one of an encryption operation and a decryption operation in accordance with the encryption and/or decryption service request received from the source device;
   responsive to determining that the edge switch can perform at least one of the encryption operation and the decryption operation in accordance with the encryption and/or decryption service request, sending a corresponding encryption and/or decryption service response to the source device;
   receiving encryption and/or decryption information for the encryption operation and/or the decryption operation from the source device, in response to the encryption and/or decryption service response from the edge switch, the encryption and/or decryption information comprising a key, a lookup table and one or more network addresses of one or more target devices;
   receiving a data packet from the source device;
   encrypting the data packet received from the source device based on encryption information in the encryption and/or decryption information to generate an encrypted data packet; and
   sending the encrypted data packet to a target device indicated by the data packet, utilizing a corresponding one of the one or more network addresses previously supplied by the source device as part of the encryption and/or decryption information;
   wherein the source device is an Internet of Things (IoT) device, the target device is a server, and the edge switch is disposed in proximity to the IoT device;
   wherein the edge switch comprises (i) a programmable switch configured to perform the encryption operation and/or the decryption operation for each of a plurality of communications between the IoT device and the server, and (ii) at least one register for storing one or more results of the encryption operation and/or the decryption operation; and
   wherein encrypting the data packet comprises:
      acquiring at least one of the key and the lookup table from the encryption and/or decryption information; and
      performing encryption on the data packet based on the at least one of the key and the lookup table.

2. The method according to claim 1, wherein the programmable switch comprises a programmable switch chip and encrypting the data packet comprises:
   encrypting the data packet by using the programmable switch chip in the programmable switch.

3. The method according to claim 2, wherein the data packet is an ingress data packet and encrypting the data packet by using the programmable switch chip comprises:
   receiving the ingress data packet in the programmable switch chip;
   dividing the ingress data packet into a plurality of data blocks;

encrypting a first data block of the plurality of data blocks in a given ingress session by using the programmable switch chip;

storing the encryption result in the register;

ejecting the encrypted first data block in an egress session;

repeating the encrypting, storing and ejecting steps until the plurality of data blocks are encrypted; and combining the corresponding encrypted data blocks to generate the encrypted data packet.

4. The method according to claim 1, further comprising:

receiving another encrypted data packet from the target device;

decrypting the other encrypted data packet based on decryption information in the encryption and/or decryption information to generate a decrypted data packet; and sending the decrypted data packet to the source device.

5. The method according to claim 1, further comprising:

dividing the data packet into a plurality of data blocks; and encrypting and/or decrypting plurality of data blocks in a pipelined manner over a plurality of ingress sessions and a plurality of egress sessions utilizing the at least one register.

6. An electronic device, comprising:

a processor; and a memory coupled to the processor and having instructions stored therein, wherein the instructions, when executed by the processor, cause the electronic device to perform actions in an edge switch, the actions comprising:

receiving an encryption and/or decryption service request from a source device;

determining whether or not the edge switch can perform at least one of an encryption operation and a decryption operation in accordance with the encryption and/or decryption service request received from the source device;

responsive to determining that the edge switch can perform at least one of the encryption operation and the decryption operation in accordance with the encryption and/or decryption service request, sending a corresponding encryption and/or decryption service response to the source device;

receiving encryption and/or decryption information for the encryption operation and/or the decryption operation from the source device, in response to the encryption and/or decryption service response from the edge switch, the encryption and/or decryption information comprising a key, a lookup table and one or more network addresses of one or more target devices;

receiving a data packet from the source device;

encrypting the data packet received from the source device based on encryption information in the encryption and/or decryption information to generate an encrypted data packet; and sending the encrypted data packet to a target device indicated by the data packet, utilizing a corresponding one of the one or more network addresses previously supplied by the source device as part of the encryption and/or decryption information;

wherein the source device is an Internet of Things (IoT) device, the target device is a server, and the edge switch is disposed in proximity to the IoT device;

wherein the edge switch comprises (i) a programmable switch configured to perform the encryption operation and/or the decryption operation for each of a plurality of communications between the IoT device and the server, and (ii) at least one register for storing one or more results of the encryption operation and/or the decryption operation; and wherein encrypting the data packet comprises:

acquiring at least one of the key and the lookup table from the encryption and/or decryption information; and performing encryption on the data packet based on the at least one of the key and the lookup table.

7. The electronic device according to claim 6, wherein the programmable switch comprises a programmable switch chip and encrypting the data packet comprises:

encrypting the data packet by using the programmable switch chip in the programmable switch.

8. The electronic device according to claim 7, wherein the data packet is an ingress data packet and encrypting the data packet by using the programmable switch chip comprises:

receiving the ingress data packet in the programmable switch chip;

dividing the ingress data packet into a plurality of data blocks;

encrypting a first data block of the plurality of data blocks in a given ingress session by using the programmable switch chip;

storing the encryption result in the register;

ejecting the encrypted first data block in an egress session;

repeating the encrypting, storing and ejecting steps until the plurality of data blocks are encrypted; and combining the corresponding encrypted data blocks to generate the encrypted data packet.

9. The electronic device according to claim 6, wherein the actions further comprise:

receiving another encrypted data packet from the target device;

decrypting the other encrypted data packet based on decryption information in the encryption and/or decryption information to generate a decrypted data packet; and sending the decrypted data packet to the source device.

10. The electronic device according to claim 9, wherein the other encrypted data packet received from the target device is encrypted by another edge switch.

11. The electronic device according to claim 6, wherein the actions further comprise:

dividing the data packet into a plurality of data blocks; and encrypting and/or decrypting the plurality of data blocks in a pipelined manner over a plurality of ingress sessions and a plurality of egress sessions utilizing the at least one register.

12. A computer program product that is tangibly stored on a computer-readable medium and comprises machine-executable instructions, wherein the machine-executable instructions, when executed, cause a machine to perform a data encryption method implemented at an edge switch, the method comprising:

receiving an encryption and/or decryption service request from a source device;

determining whether or not the edge switch can perform at least one of an encryption operation and a decryption operation in accordance with the encryption and/or decryption service request received from the source device;

responsive to determining that the edge switch can perform at least one of the encryption operation and the decryption operation in accordance with the encryption and/or decryption service request, sending a corresponding encryption and/or decryption service response to the source device;

receiving encryption and/or decryption information for the encryption operation and/or the decryption operation from the source device, in response to the encryption and/or decryption service response from the edge switch, the encryption and/or decryption information comprising a key, a lookup table and one or more network addresses of one or more target devices;

receiving a data packet from the source device;

encrypting the data packet received from the source device based on encryption information in the encryption and/or decryption information to generate an encrypted data packet; and sending the encrypted data packet to a target device indicated by the data packet, utilizing a corresponding one of the one or more network addresses previously supplied by the source device as part of the encryption and/or decryption information;

wherein the source device is an Internet of Things (IoT) device, the target device is a server, and the edge switch is disposed in proximity to the IoT device;

wherein the edge switch comprises (i) a programmable switch configured to perform the encryption operation and/or the decryption operation for each of a plurality of communications between the IoT device and the server, and (ii) at least one register for storing one or more results of the encryption operation and/or the decryption operation; and wherein encrypting the data packet comprises:
  acquiring at least one of the key and the lookup table from the encryption and/or decryption information; and
  performing encryption on the data packet based on the at least one of the key and the lookup table.

13. The computer program product according to claim 12, wherein the programmable switch comprises a programmable switch chip and encrypting the data packet comprises: encrypting the data packet by using the programmable switch chip in the programmable switch.

14. The computer program product according to claim 13, wherein the data packet is an ingress data packet and encrypting the data packet by using the programmable switch chip comprises:
  receiving the ingress data packet in the programmable switch chip;
  dividing the ingress data packet into a plurality of data blocks;
  encrypting a first data block of the plurality of data blocks in a given ingress session by using the programmable switch chip;
  storing the encryption result in the register;
  ejecting the encrypted first data block in an egress session;
  repeating the encrypting, storing and ejecting steps until the plurality of data blocks are encrypted; and
  combining the corresponding encrypted data blocks to generate the encrypted data packet.

15. The computer program product according to claim 12, wherein the method further comprises:
  receiving another encrypted data packet from the target device;
  decrypting the other encrypted data packet based on decryption information in the encryption and/or decryption information to generate a decrypted data packet; and
  sending the decrypted data packet to the source device.

16. The computer program product according to claim 15, wherein the other encrypted data packet received from the target device is encrypted by another edge switch.

17. The computer program product according to claim 12, wherein the method further comprises:
  dividing the data packet into a plurality of data blocks; and
  encrypting and/or decrypting the plurality of data blocks in a pipelined manner over a plurality of ingress sessions and a plurality of egress sessions utilizing the at least one register.

* * * * *